United States Patent
Goldenberg et al.

(10) Patent No.: US 11,131,836 B2
(45) Date of Patent: *Sep. 28, 2021

(54) AUTO FOCUS AND OPTICAL IMAGE STABILIZATION IN A COMPACT FOLDED CAMERA

(71) Applicant: Corephotonics Ltd., Tel-Aviv (IL)

(72) Inventors: Ephraim Goldenberg, Ashdod (IL); Gal Shabtay, Tel Aviv (IL); Gal Avivi, Haifa (IL); Michael Dror, Nes Ziona (IL); Gil Bachar, Tel-Aviv (IL); Itay Jerby, Netanya (IL); Itay Yedid, Karme Yosef (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,743

(22) Filed: Feb. 15, 2021

(65) Prior Publication Data

US 2021/0165195 A1   Jun. 3, 2021

Related U.S. Application Data

(63) Continuation of application No. 16/861,866, filed on Apr. 29, 2020, now Pat. No. 10,962,746, which is a (Continued)

(51) Int. Cl.
*G02B 27/64*   (2006.01)
*G02B 13/00*   (2006.01)
(Continued)

(52) U.S. Cl.
CPC .......... *G02B 13/0065* (2013.01); *G02B 7/08* (2013.01); *G02B 7/09* (2013.01); *G02B 13/16* (2013.01);
(Continued)

(58) Field of Classification Search
CPC ........ G02B 7/04; G02B 27/64; G02B 27/646; H04N 5/23248; H04N 5/23264; H04N 5/2328; H04N 5/23287
(Continued)

(56) References Cited

U.S. PATENT DOCUMENTS 9,927,600 B2 * 3/2018 Goldenberg ....... G02B 13/0065
10,571,666 B2 * 2/2020 Goldenberg ............ G02B 7/08
(Continued)

*Primary Examiner* — Arnel C Lavarias
(74) *Attorney, Agent, or Firm* — Nathan & Associates; Menachem Nathan

(57) ABSTRACT

Compact folded camera modules having auto-focus (AF) and optical image stabilization (OIS) capabilities and multi-aperture cameras including such modules. In an embodiment, a folded camera module includes an optical path folding element (OPFE) for folding light from a first optical path with a first optical axis to a second optical path with a second optical axis perpendicular to the first optical axis, an image sensor and a lens module carrying a lens with a symmetry axis parallel to the second optical axis. The lens module can be actuated to move in first and second orthogonal directions in a plane perpendicular to the first optical axis, the movement in the first direction being for auto-focus and the movement in the second direction being for OIS. The OPFE can be actuated to tilt for OIS.

18 Claims, 14 Drawing Sheets

Related U.S. Application Data continuation of application No. 16/782,707, filed on Feb. 5, 2020, now Pat. No. 10,678,029, which is a continuation of application No. 16/289,672, filed on Mar. 1, 2019, now Pat. No. 10,571,666, which is a continuation of application No. 15/917,701, filed on Mar. 11, 2018, now Pat. No. 10,613,303, which is a continuation of application No. 15/303,863, filed as application No. PCT/IB2016/052179 on Apr. 15, 2016, now Pat. No. 9,927,600.

(60) Provisional application No. 62/238,890, filed on Oct. 8, 2015, provisional application No. 62/148,435, filed on Apr. 16, 2015.

(51) Int. Cl.
*G02B 13/16* (2006.01)
*G02B 7/08* (2021.01)
*H04N 5/225* (2006.01)
*H04N 5/232* (2006.01)
*G02B 7/09* (2021.01)
*G02B 26/08* (2006.01)

(52) U.S. Cl.
CPC ......... *G02B 27/646* (2013.01); *H04N 5/2257* (2013.01); *H04N 5/2258* (2013.01); *H04N 5/23258* (2013.01); *H04N 5/23287* (2013.01); *G02B 26/0816* (2013.01)

(58) Field of Classification Search
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS 10,613,303 B2 * 4/2020 Goldenberg ....... H04N 5/23287
10,678,029 B1 * 6/2020 Goldenberg ......... H04N 5/2258
10,962,746 B2 * 3/2021 Goldenberg ........... G02B 13/16

* cited by examiner

300

AUTO FOCUS AND OPTICAL IMAGE STABILIZATION IN A COMPACT FOLDED CAMERA

CROSS-REFERENCE TO RELATED APPLICATIONS

This application is a continuation application from U.S. patent application Ser. No. 16/861,866 filed Apr. 29, 2020 (now allowed), which was a continuation application from U.S. patent application Ser. No. 16/782,707 filed Feb. 5, 2020 (now U.S. Pat. No. 10,678,029), which was a continuation application from U.S. patent application Ser. No. 16/289,672 filed Mar. 1, 2019 (now U.S. Pat. No. 10,571,666), which was a continuation application from U.S. patent application Ser. No. 15/917,701 filed Mar. 11, 2018 (now U.S. Pat. No. 10,613,303), which was a continuation application from U.S. patent application Ser. No. 15/303,863 filed Oct. 13, 2016 (now U.S. Pat. No. 9,927,600), which was a 371 application from international patent application PCT/IB2016/052179 filed Apr. 15, 2016, and is related to and claims priority from US Provisional Patent Applications No. 62/148,435 filed on Apr. 16, 2015 and No. 62/238,890 filed Oct. 8, 2015, both applications expressly incorporated herein by reference in their entirety.

FIELD

Embodiments disclosed herein relate in general to digital cameras and in particular to folded-lens digital cameras and dual-aperture digital cameras with a folded lens.

BACKGROUND

In recent years, mobile devices such as cell-phones (and in particular smart-phones), tablets and laptops have become ubiquitous. Many of these devices include one or two compact cameras including, for example, a main rear-facing camera (i.e. a camera on the back face of the device, facing away from the user and often used for casual photography), and a secondary front-facing camera (i.e. a camera located on the front face of the device and often used for video conferencing).

Although relatively compact in nature, the design of most of these cameras is similar to the traditional structure of a digital still camera, i.e. it comprises a lens module (or a train of several optical elements) placed on top of an image sensor. The lens module refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions (e.g. in a X-Y plane), the larger the focal length and the optics height.

In recent times, a "folded camera module" structure has been suggested to reduce the height of a compact camera. In the folded camera module structure, an optical path folding element (referred to hereinafter as "OPFE") e.g. a prism or a mirror (otherwise referred to herein collectively as a "reflecting element") is added in order to tilt the light propagation direction from perpendicular to the smart-phone back surface to parallel to the smart-phone back surface. If the folded camera module is part of a dual-aperture camera, this provides a folded optical path through one lens module (e.g. a Tele lens). Such a camera is referred to herein as a "folded-lens dual-aperture camera" or a "dual-aperture camera with a folded lens". In general, the folded camera module may be included in a multi-aperture camera, e.g. together with two "non-folded" camera modules in a triple-aperture camera.

In addition to the lens module and sensor, modern cameras usually further include a mechanical motion (actuation) mechanism for two main purposes: focusing of the image on the sensor, and optical image stabilization (OIS). For focusing, in more advanced cameras, the position of the lens module (or at least of a lens element in the lens module) can be changed by means of an actuator and the focus distance can be changed in accordance with the captured object or scene.

The trend in digital still cameras is to increase the zooming capabilities (e.g. to 5×, 10× or more) and, in cell-phone (and particularly smart-phone) cameras, to decrease the sensor pixel size and to increase the pixel count. These trends result in greater sensitivity to camera shake for two reasons: 1) greater resolution, and 2) longer exposure time due to smaller sensor pixels. An OIS mechanism is required to mitigate this effect.

In OIS-enabled cameras, the lens module lateral position can be moved, or the entire camera module can be tilted in a fast manner to cancel camera shake during-image capture. Camera shakes shift the camera module in 6 degrees of freedom, namely linear movements in X-Y-Z, roll ("tilt about" or "tilt around") the X axis, yaw (tilt around the Z axis) and pitch (tilt around the Y axis). While the linear motion in X-Y-Z negligibly affects the image quality and does not have to be compensated, compensation of the tilt angles is required. OIS systems shown in known designs (see e.g. US 20140327965A1) correct yaw and pitch, but not roll motion.

A folded-lens dual-aperture camera with an auto-focus (AF) mechanism is disclosed in Applicant's US published patent application US 20160044247, the description and figures of which are incorporated herein by reference in their entirety.

SUMMARY

FIG. 1 shows a schematic illustration of a design that provides a "low height" folded camera module. The figure shows a folded camera module 100 comprising an OPFE 102, a lens module 104 configured to mechanically hold lens elements therein, and an image sensor 106.

OPFE 102 can be for example any one of a mirror, a prism or a prism covered with a metallic reflecting surface. OPFE 102 can be made of various materials including for example plastic, glass, a reflective metal or a combination of two or more of these materials. According to some non-limiting examples, the lens module in camera 100 has a 6-15 mm focal length ("Tele lens"), and it can be fitted in a dual-aperture camera together with a second non-folded camera module having a 3-5 mm focal length ("Wide lens") lens and a second sensor (not shown).

AF functionality for the Tele lens is achieved by moving the lens module 104 along the Z axis. The Applicant has found that OIS functionality for camera 100 can be achieved in at least two ways. To compensate for camera tilt around the Z axis, lens module 104 can be shifted in the Y direction and/or OPFE 102 can be tilted around the Z axis or the X axis. However, optical analysis performed by the Applicant has shown that the tilt of the OPFE around the Z axis introduces also an undesired tilt of the image around the Z axis (roll) on sensor 106. This solution is thus lacking, since it contradicts the basic idea behind OIS functionality and since it also increases computational fusion time (needed for generating a fused image in a dual aperture camera from fusion of the Wide image, generated by the Wide lens, and a Tele image, generated by the Tele lens) due to image disparity of the Tele and Wide sensors.

Applicant has further found that to compensate for camera tilt around the Y axis, the lens module can be moved in the X direction and/or the OPFE can be tilted around the Y axis. However, it has also been found by the Applicant that when shifting the lens module in the X direction, the height of the module will increase. Shifting the lens module in the X direction for OIS and in the Z direction for focus may require to increase module height to about 9-9.5 mm for a lens with a diameter of 6-6.5 mm, as is the case with known OIS solutions. This height addition reflects directly on the phone thickness and is undesirable in accordance with modern smart-phone design requirements.

Accordingly, the presently disclosed subject matter includes a folded camera module comprising both AF and OIS mechanisms in a manner allowing maintenance of a desired folded camera module height. Furthermore, the incorporation of such mechanisms and capabilities does not result in compromising camera height. The presently disclosed subject matter further contemplates a folded-lens dual-aperture camera that incorporates such a folded camera module.

Embodiments disclosed herein teach folded camera modules and folded-lens dual-aperture cameras in which the OIS functionality is divided between two optical elements as follows: a shift of the folded lens module along one axis (e.g. the Y axis) and rotation of the OPFE about an axis parallel to the same axis.

In an embodiment, there is provided a folded camera module comprising an OPFE for folding light from a first optical path to a second optical path, the second path being along a second optical axis. The folded camera module further comprises an image sensor, and a lens module carrying a lens assembly with a symmetry axis along the second optical axis, wherein the lens module is designed to move in a first direction and in a second direction orthogonal to the first direction, the first and second directions being in a plane containing the second optical axis and perpendicular to a plane containing the first and second optical paths, and wherein the OPFE is designed to be tilted around the second direction.

Note that as used herein, "tilt around a direction" means tilt around a line or axis in, or parallel to, the direction.

In an embodiment, the lens module movement is in the first direction along the second optical axis for AF and the lens module movement in the second direction orthogonal to the first direction is for OIS, compensating for tilt of the camera module around the first direction.

In an embodiment, the OPFE movement is for OIS, compensating for tilt of the camera module around the second direction.

In an embodiment, a folded camera module further comprises a lens actuation sub-assembly configured to cause lens module movement in the first and second directions, and an OPFE actuation sub-assembly configured to cause movement of the OPFE so as to tilt the first optical path.

In an embodiment, each of the lens actuation and OPFE actuation sub-assemblies includes a plurality of flexible hanging members.

In an embodiment, the flexible hanging members of the lens actuation sub-assembly are parallel to each other.

In an embodiment, the flexible hanging members of the OPFE actuation sub-assembly are tilted.

In an embodiment, a folded camera module further comprises an actuation controller configured to receive data input indicative of tilt in at least one direction and data input from position sensors coupled to the lens actuation sub-assembly, and, responsive to the data inputs, configured to generate instructions to the lens actuation sub-assembly to cause movement in the second direction for optical image stabilization (OIS).

In an embodiment, the actuation controller is further configured to receive data input indicative of tilt in at least one direction and data input from position sensors coupled to the OPFE actuation sub-assembly, and, responsive to the data input, configured to generate instructions to the OPFE actuation sub-assembly to cause movement of the OPFE for OIS.

In an embodiment, the actuation controller is further configured to receive data input indicative of focus, and, responsive to the data input, configured to generate instructions to the lens actuation sub-assembly to cause movement in the first direction for AF.

In an embodiment, the OPFE movement to tilt is around an axis perpendicular to the first and second optical directions.

In an embodiment, the lens module movement in the first direction is parallel to the second optical axis and the lens module movement in the second direction is perpendicular to the second optical axis.

In an embodiment, the OPFE includes a prism.

In an embodiment, the OPFE includes a mirror.

In an embodiment, the lens actuation sub-assembly includes a plurality of coil-magnet pairs for actuating the lens module movement in the first and second directions.

In an embodiment, the plurality of coil-magnet pairs includes two coil-magnet pairs.

In an embodiment, the plurality of coil-magnet pairs includes three coil-magnet pairs.

In an embodiment, the plurality of coil-magnet pairs includes four coil-magnet pairs.

In an embodiment, one of the four coil-magnet pairs is positioned between the lens module and the image sensor.

In an embodiment, a camera module further comprises one or more position sensors associated with a coil-magnet pair, the one or more position sensors enabling measurement of a position of the lens module.

In an embodiment, the one or more position sensors enable position measurement of the lens module along the first and second movement directions.

In an embodiment, the one or more position sensors further enables position measurement of the lens module in a tilt around an axis perpendicular to the first and second movement directions.

In an embodiment, a position sensor is coupled to the lens actuation sub-assembly and to the actuation controller such as to allow movement of the lens module along the first and second movement directions while preventing tilt around an axis perpendicular to the first and second movement directions.

In an embodiment, the one or more position sensors include a Hall-bar sensor.

In an embodiment, two or three coil-magnet pairs are arranged to passively prevent undesired tilt around an axis that lies in the plane containing the first and second optical paths and is perpendicular to the second optical axis.

In an embodiment, three coil-magnet pairs are arranged to actively prevent undesired tilt around an axis that lies in the plane containing the first and second optical paths and is perpendicular to the second optical axis.

In an embodiment, there is provided a dual-aperture camera, comprising a folded camera module of any embodiment above and a non-folded camera module comprising a non-folded camera image sensor and a non-folded camera lens module with a lens axis along a first optical axis perpendicular to the second optical axis.

The presently disclosed subject matter further contemplates a multi-aperture camera, comprising three or more camera modules, where at least one of the camera modules is a folded camera module as described above and any one of the other camera modules can be either a folded camera module or a non-folded camera module.

The presently disclosed subject matter further includes a method of compensating for tilt in a folded camera module comprising an OPFE, a lens module carrying a lens assembly and an image sensor, the method comprising: using the OPFE for folding light from a first optical path to a second optical path, the second optical path being along a second optical axis, the lens module having a symmetry axis along the second optical axis, moving the lens module in a first direction and in a second direction orthogonal to the first direction, the first and second directions being in a plane containing the second optical axis and perpendicular to a plane containing the first and second optical paths, wherein the lens module movement in the first direction is for autofocus and the lens module movement in the second direction orthogonal to the first direction is for OIS compensating for tilt of the camera module around the first direction, and moving the OPFE to be tilted around the second direction, wherein the OPFE movement is for OIS, compensating for tilt of the camera module around the second direction.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

DETAILED DESCRIPTION

In the description below (and as shown at least in FIG. 2) a reflecting element (OPFE) 208 reflects light from a first optical path or direction 205 to a second optical path or direction 206 (the latter converging with the second optical axis). Both the first and second optical directions define a plane (herein "first plane") that contains both optical axes.

The following system of orthogonal X-Y-Z coordinates is chosen by way of example and for explanation purposes only: the Z axis is parallel to (or coaxial with) the second optical axis, the second optical axis being an axis of the folded camera module described below; the Y axis is orthogonal to a first optical axis and to the second optical axis; the X-axis is orthogonal to the Y and Z axes.

Figure 1:
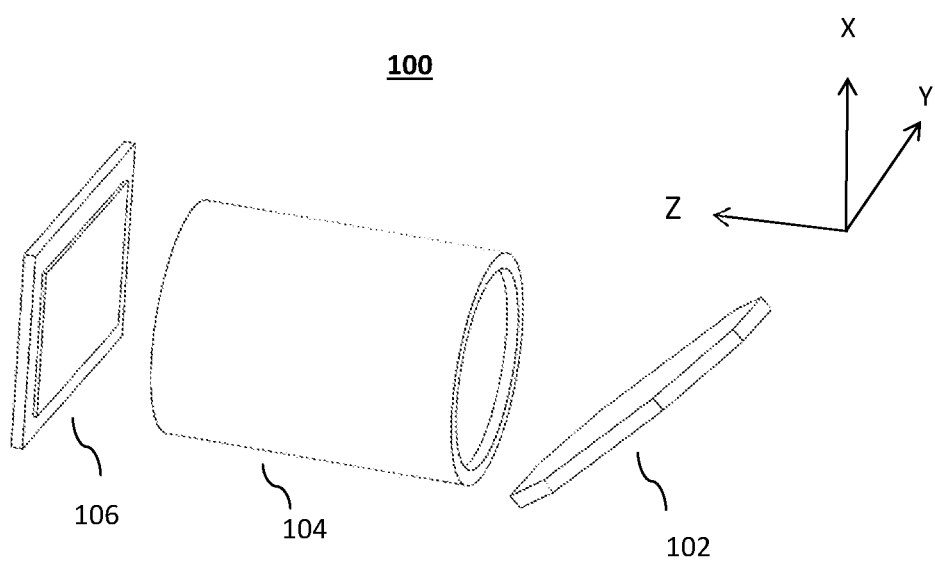
FIG. 1 shows a schematic illustration of a folded camera module comprising both AF and OIS mechanisms, according to an example of the presently disclosed subject matter.
Figure 2A:
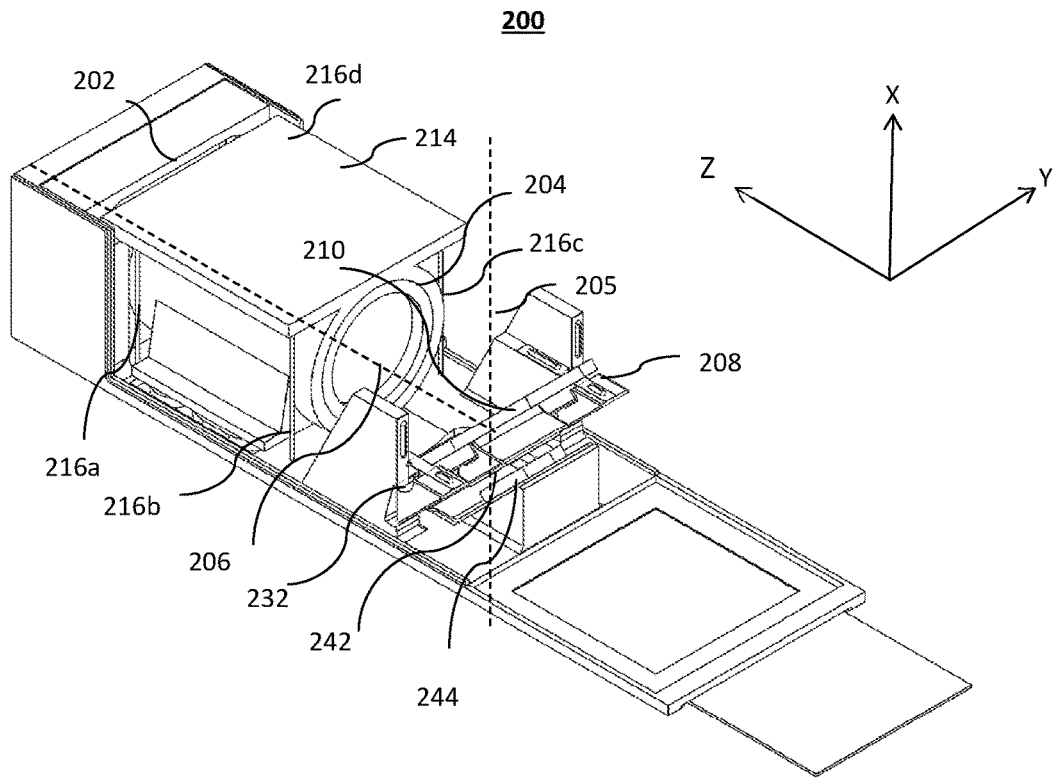
FIG. 2A shows schematically an isometric view of a folded camera module comprising both AF and OIS mechanisms, according to an example of the presently disclosed subject matter.

FIG. 2A shows schematically an isometric view of a folded camera module numbered 200, according to an example of the presently disclosed subject matter. Folded camera module 200 comprises an image sensor 202 having an imaging surface in the X-Y plane, a lens module 204 with an optical axis 206 defined above as "second optical axis" and an OPFE 208 having a surface plane 210 tilted to the image sensor surface, such that light arriving along a first optical path or direction 205 is tilted by the OPFE to the second optical axis or direction 206.

Folded camera module 200 further comprises a lens actuation sub-assembly 230 (shown in FIG. 4) for moving lens module 204 in the Y-Z plane ("second plane"). Lens actuation sub-assembly 230 comprises a lens barrel 214 (made for example from plastic), which houses lens elements 204. Lens actuation sub-assembly 230 further comprises a hanging structure comprising four flexible hanging members 216a-d that hang lens barrel 214 over a base 218 (see FIG. 4). Members 216a-d are parallel to each other. In some embodiments, members 216a-d may be in the form of four wires and may be referred to as "wire springs" or "poles". Hanging members 216a-d allow in-plane motion which is known in the art and described for example in Applicant's published PCT patent application No. WO2015/068056, the description and figures of which are incorporated herein by reference in their entirety. The hanging structure with members 216a-d thus allows a first type of motion of the lens module relative to the base in substantially the Y-Z plane under actuation by three actuators.

An actuator can be for example of a type sometimes referred in the art as "voice coil motor" (VCM). Lens actuation sub-assembly 230 further comprises three magnets 222a-c (shown in FIG. 4) that are part of three magnetic structures (e.g. VCMs) referred to hereafter as first actuator, second actuator and third actuator, respectively. Each actuator comprises a coil in addition to a respective magnet. Thus, the first actuator comprises magnet 222a and a coil 224a, the second actuator comprises magnet 222b and a coil 224b and the third actuator comprises magnet 222c and a coil 224c.

Camera module 200 further comprises an OPFE actuation sub-assembly that allows tilting of OPFE 208. A first embodiment numbered 260 of such an actuation sub-assembly is shown in FIGS. 5A-E.

Figure 2B:
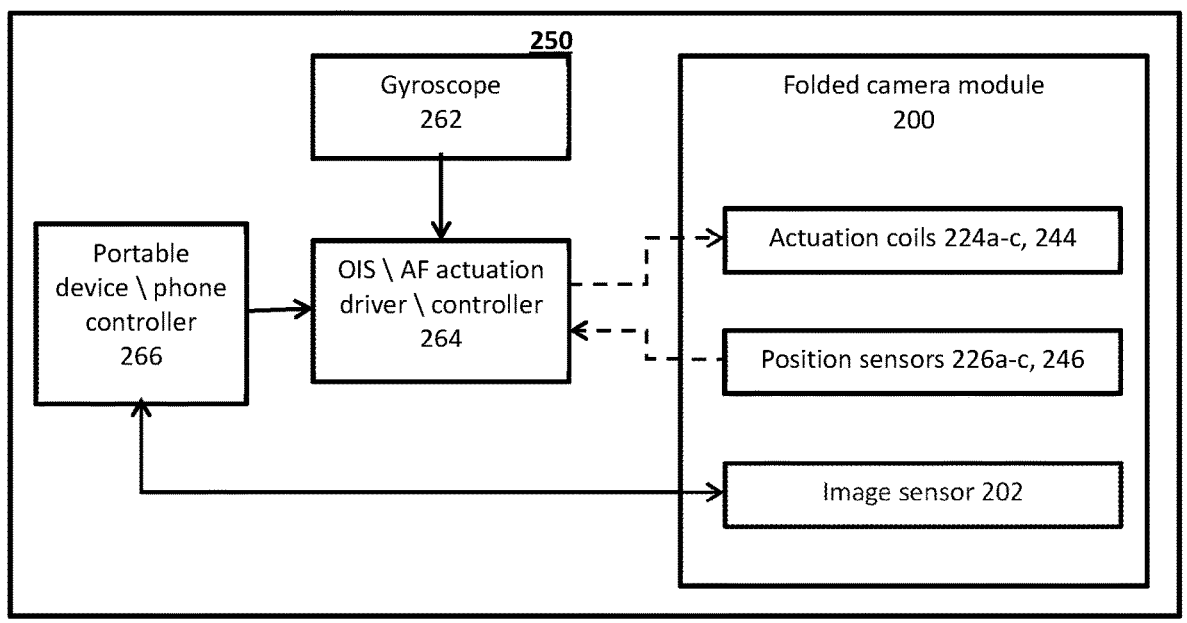
FIG. 2B shows schematically a functional block diagram of a device including a folded camera module operative to perform AF and OIS, according to an example of the presently disclosed subject matter.

FIG. 2B shows schematically a functional block diagram of device 250 that includes a folded camera module such as module 200, operative to perform AF and OIS. The device can be for example a portable electronic device such as a smart-phone. Device 250 includes, in addition to folded camera module 200, a gyroscope 262, an OIS/AF actuation driver/controller 264 (also referred to simply as "actuation controller") and a portable device/phone controller 266. The folded camera module is shown including elements described above and below. The performance of OIS and AF by device (e.g. a smart-phone) 250 is described in detail below. In general, gyroscope 262 provides data input indicative of tilt in at least one direction to controller 264.

Similarly, position sensors 226a-c and 246 (the latter described below) are configured to provide position inputs to driver/controller 264. Device/phone controller 266 is coupled to the image sensor and is configured to provide instructions to actuation controller 264. The instructions include, for example, AF desired position and/or OIS toggle on/off. Actuation controller 264 can provide actuation commands, responsive to the data input from gyroscope and position sensors, to actuation coils 224a-c and 244 (the latter described below) for generating motion compensating for the detected tilt and/or for obtaining a desired focus position.

Figure 3A:
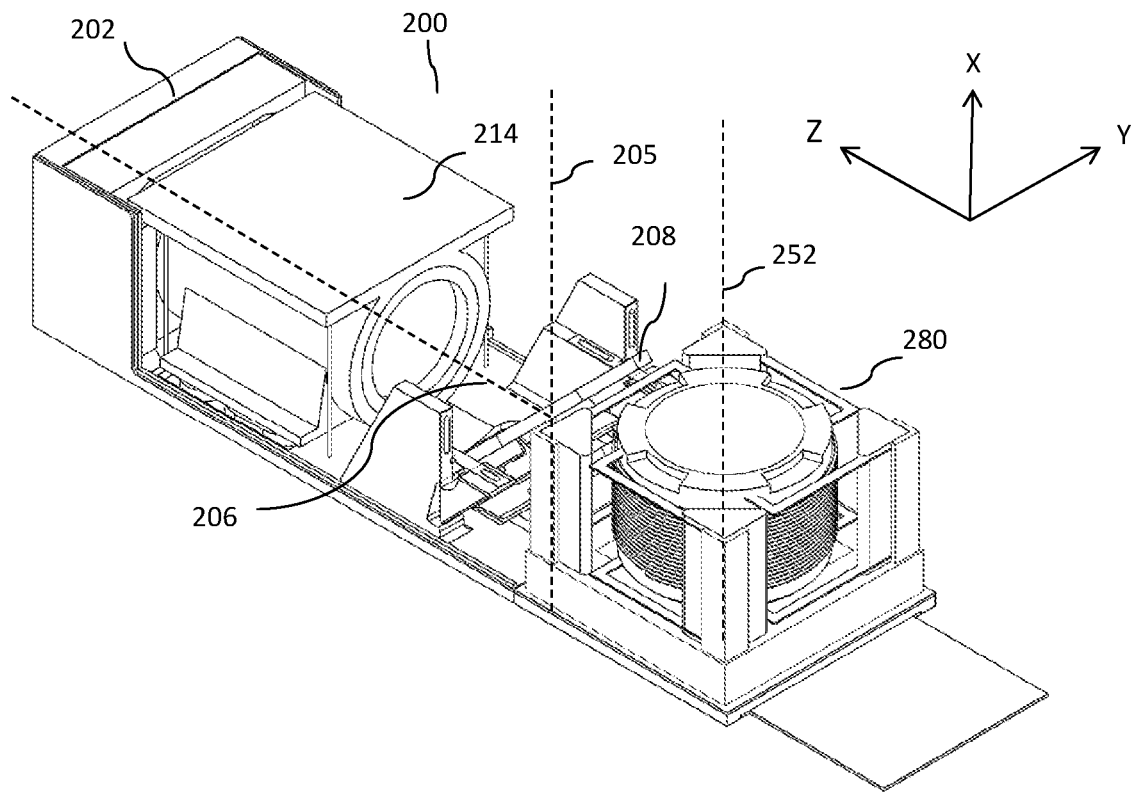
FIG. 3A shows schematically an isometric view of a dual-aperture camera that includes the folded camera module of FIG. 2 together with a second, upright camera module, according to an example of the presently disclosed subject matter.
Figure 3B:
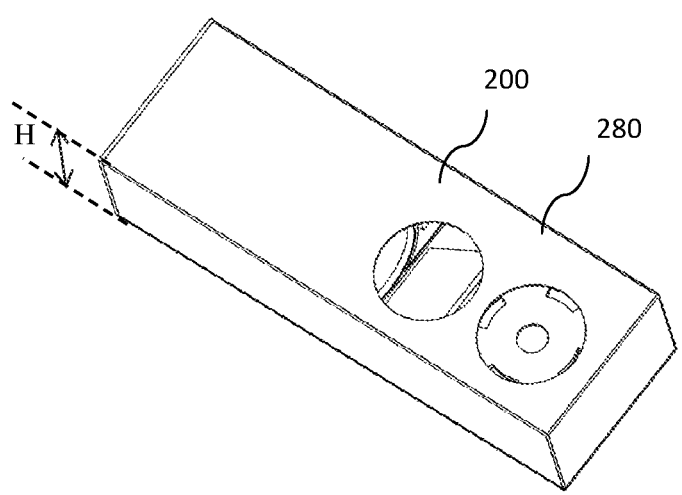
FIG. 3B shows schematically an external view of a dual-aperture camera that includes the folded camera module of FIG. 2 together with a second, upright camera module, according to an example of the presently disclosed subject matter.

Folded camera module 200 can for example be included in a folded-lens dual-aperture camera described in Applicant's US published patent application US 20160044247. FIG. 3A shows schematically an isometric view of a folded-lens dual-aperture camera 300 that includes the folded camera module of FIG. 2 together with a second, upright camera module. FIG. 3B shows schematically camera 300 in an external view. Camera 300 includes, in addition to folded camera module 200, an upright (non-folded) camera module 280 having a first optical axis 252 which is perpendicular to the second optical axis and to the second plane. The height of the dual-aperture camera is indicated by H. H can be for example between 4 mm-7 mm.

Figure 4:
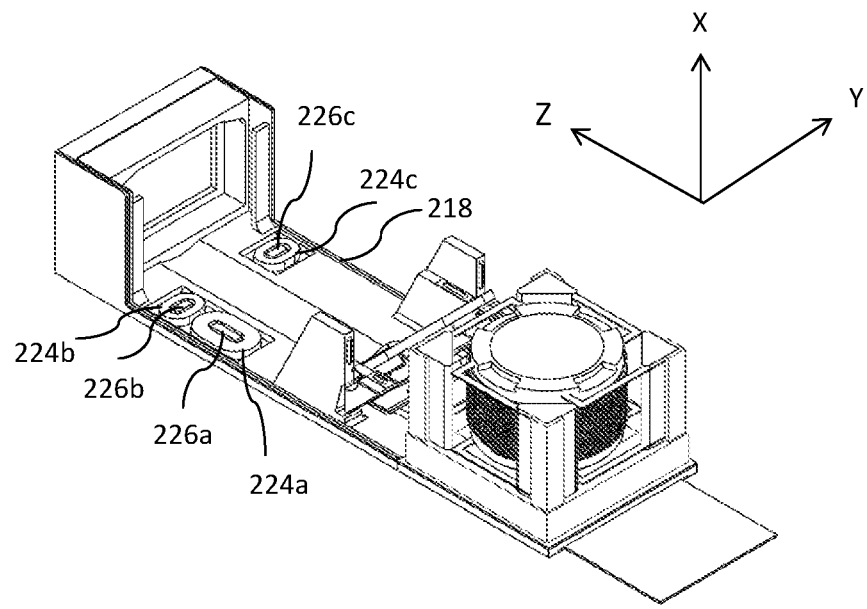
FIG. 4 shows schematically an isometric view of the dual-aperture camera of FIG. 3A with the folded lens module removed from its mounting and turned upside down, according to an example of the presently disclosed subject matter.
Figure 4:
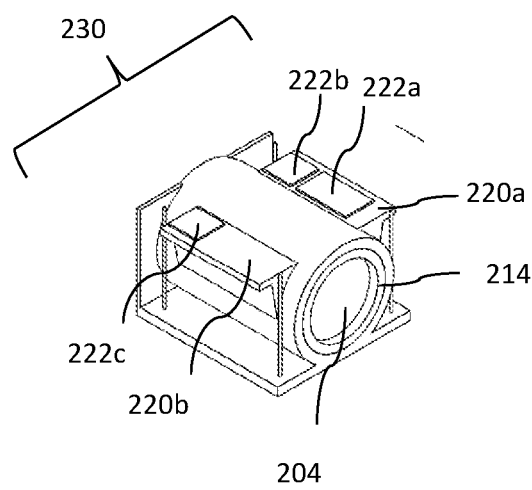

FIG. 4 shows, for clarity, camera 300 including folded camera module 200 with lens actuation sub-assembly 230 (comprising lens barrel 214 and its poles 216a-d) disassembled from base 218 and turned upside down, showing an underside with two plate sections 220a and 220b. The three magnets 222a-c are positioned (e.g. rigidly assembled/mounted/glued) on the underside plate sections.

The three corresponding coils 224a-c are positioned on base 218. When lens actuation sub-assembly 230 is assembled, magnets 222a, 222b and 222c are located just above coils 224a, 224b and 224c, respectively. As described below ("magnetic operation" section), in operation, a Lorentz force may be applied on coil 224a along the Y axis direction and on two magnets 222b-c along the Z axis direction. As further described below ("mechanical operation" section), having these three forces on the three magnets allows three mechanical degrees of freedom in the motion of the center of mass of lens actuation sub-assembly 230: linear Y and Z motions, and tilt around X axis motion.

The motion of the lens actuation sub-assembly 230 in the Y and Z directions (i.e. in the Y-Z plane) can be measured by position sensors, for example Hall-bar sensors (or just "Hall-bars") 226a-c which are coupled to the magnetic field created by, respectively, magnets 222a-c. When the lens module moves in the Y-Z plane, the magnetic field sensed by Hall-bars 226a-c changes and the motion can be sensed at three points, as known in the art. This allows determination of three types of motion, i.e. Y direction motion, Z direction motion and tilt around X axis motion.

Figure 5A:
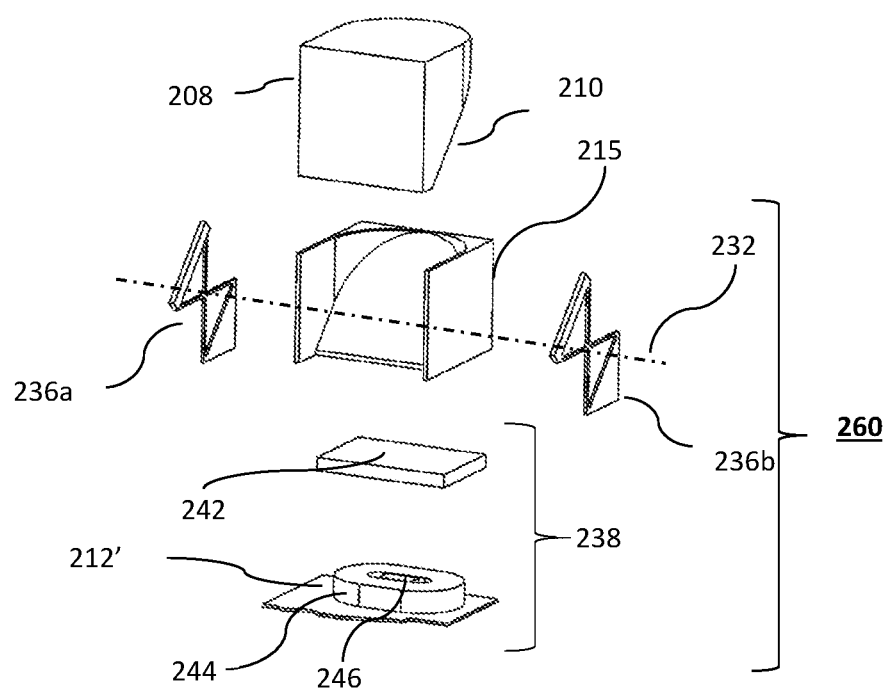
FIG. 5A shows an exploded isometric view of an embodiment of an OPFE actuation sub-assembly, in which the OPFE in the form of a prism, according to an example of the presently disclosed subject matter.
Figure 5B:
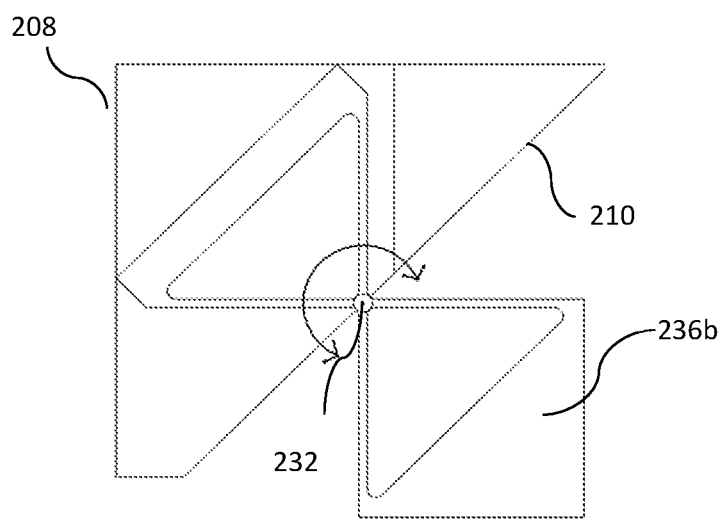
FIG. 5B shows a side view of part of the OPFE actuation sub-assembly of FIG. 5A, according to an example of the presently disclosed subject matter.

FIG. 5A shows an exploded isometric view of OPFE actuation sub-assembly 260, according to an example of the presently disclosed subject matter. According to the illustrated example, OPFE actuation sub-assembly 260 includes hinge springs 236a-b that suspend the prism and which can convert linear to angular motion. These hinge springs allow tilting of prism 208 around a hinge axis 232, which is parallel to, or along the Y axis. The tilt can be for example ±1° from a zero (rest) position of the prism.

In an embodiment shown in FIG. 5A, the hinge springs may be in the form of single-part flexible supports 236a and 236b, each attached at a side of the prism. The prism and its reflecting surface plane 210, hinge axis 232 and flexible support 236b are also shown in a side view in FIG. 5B.

Actuation sub-assembly 260 further includes an actuator 238 (referred to hereinafter as a "fourth" actuator) that includes a magnet 242 rigidly coupled to prism 208 (in the illustrated example—through an adaptor 215) and a coil 244 rigidly coupled to a base 212'.

Figure 5C:
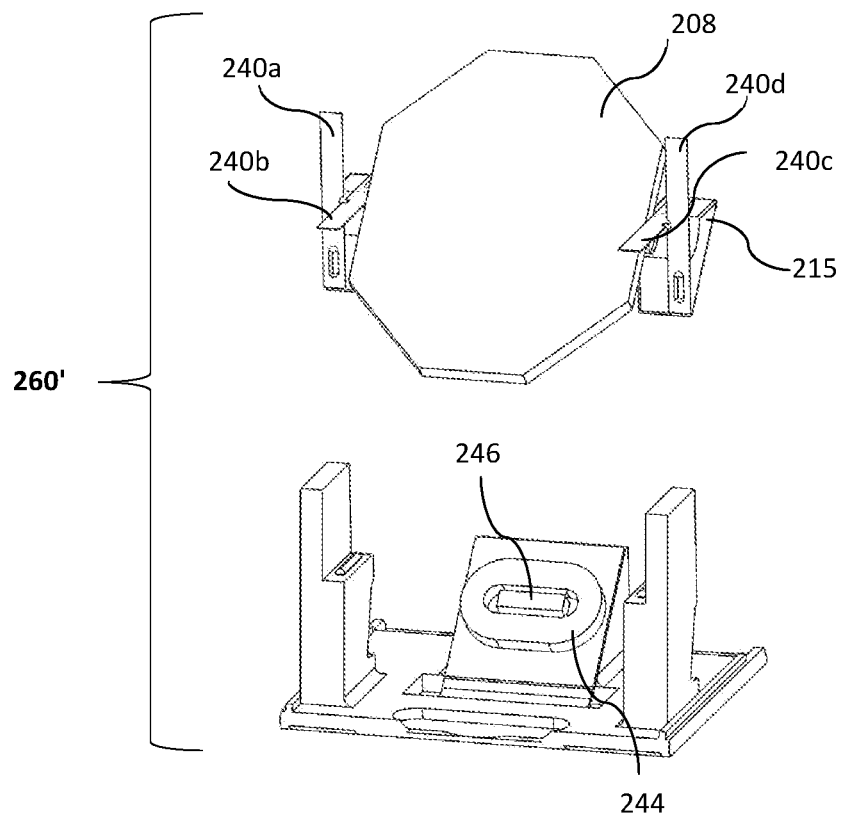
FIG. 5C shows an isometric exploded view of an OPFE actuation sub-assembly, in which the OPFE is in the form of a mirror, according to an example of the presently disclosed subject matter.
Figure 5D:
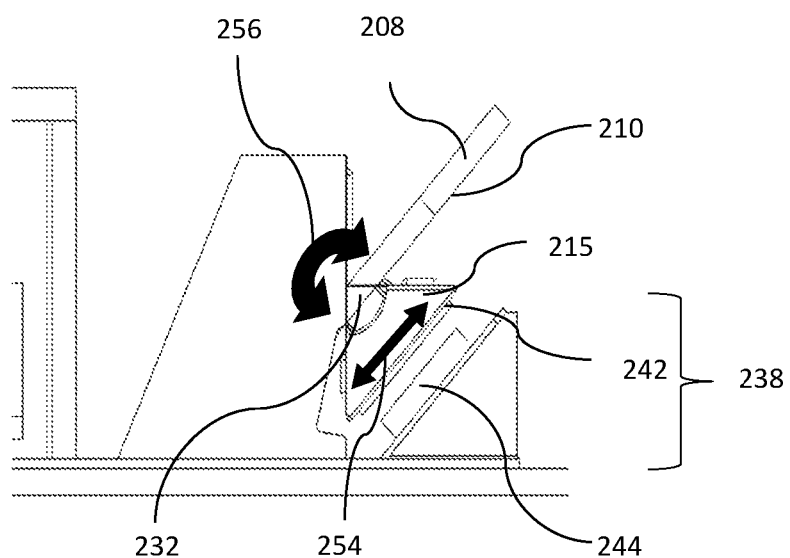
FIG. 5D shows a side view of part of the OPFE actuation sub-assembly of FIG. 5C, according to an example of the presently disclosed subject matter.
Figure 5E:
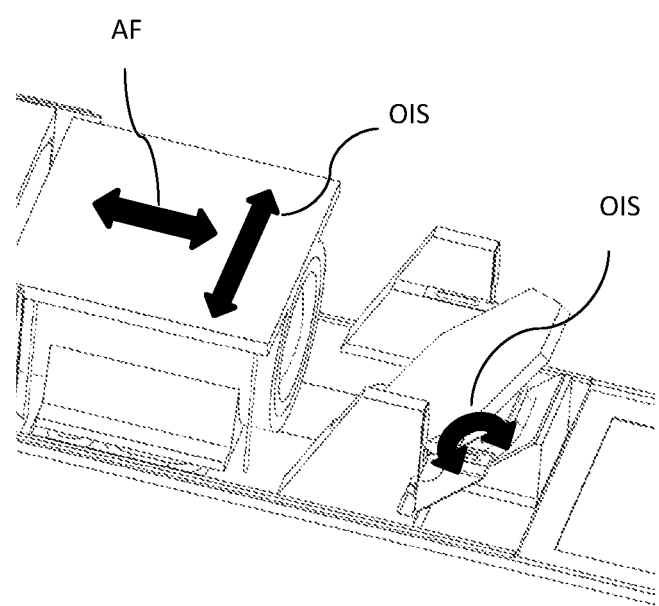
FIG. 5E shows schematically the AF and OIS movements of the lens module and the OIS tilt movement of the OPFE, according to an example of the presently disclosed subject matter.

Regarding a hinge spring, it can be designed in at least two different ways. In one design, mentioned and shown in FIGS. 5A and 5B, the hinge spring may comprise two single-part flexible supports 236a and 236b attached at each side of the prism. Another design is illustrated in FIGS. 5C and 5D. FIG. 5C shows an isometric exploded view of another embodiment of an OPFE actuation sub-assembly 260', in which the OPFE is in the form of a mirror 208. FIG. 5D shows actuation sub-assembly 260' assembled, in a side view. Actuation sub-assembly 260' includes a hinge spring having two sets of leaf springs mounted at each side of the mirror, a first set having two spring members 240a and 240b perpendicular to each other and a second set having two spring members 240c and 240d perpendicular to each other. The rotation axis will be around a virtual line drawn between the intersection points of each springs set 240a-b and 240c-d. FIG. 5E shows schematically the AF and OIS movements of the lens module and the OIS tilt movement of the OPFE.

The hinge spring of any of the embodiments presented may convert force in any direction parallel to the X-Z plane to a torque around the Y axis such that tilt around the Y axis is created.

As described with reference to FIGS. 5C and 5D and further below, in operation, a Lorentz force may be applied between coil 244 and magnet 242 in order to move magnet 242 in a direction indicated by an arrow 254 (FIG. 5D). This force (and magnet movement) is then converted by the hinge to a tilt motion around the Y axis indicated by an arrow 256 (FIG. 5D). The motion is measured by a Hall-bar sensor 246. In camera module 200, the fourth actuator is positioned such that the force applied is in the +X−Z or −X+Z direction, (at 45 degrees to both X and Z axes, see below "magnetic operation" section). However, in other examples, the orientation of the fourth actuator can be such that the force is directed at any angle in the X-Z plane, as long as torque is applied around the hinge axis 232 (for example the fourth actuator as shown in the embodiment of FIG. 5A). The actuators and Hall-bars sensors of camera module 200 are listed in Table 1.

TABLE 1

| Actuator number | Coil element | Magnet element | Hall-bar | Magnetic poles directions | Coil long vertex direction | Force direction (Coil short vertex direction) |
|---|---|---|---|---|---|---|
| 1st | 224a | 222a | 226a | ±X | ±Z | ±Y |
| 2nd | 224b | 222b | 226b | ±X | ±Y | ±Z |
| 3rd | 224c | 222c | 226c | ±X | ±Y | ±Z |
| 4th | 244 | 242 | 246 | +X + Z or −X − Z | ±Y | +X − Z or −X + Z |
|  | 244 | 242 | 246 | ±X | ±Y | ±Z |

According to the presently disclosed subject matter, camera module 200 further comprises or is otherwise operatively connected to at least one controller (e.g. controller 264) configured to control operation of the lens and OPFE actuation sub-assemblies 230 and 260 for generating movement to compensate for camera shakes that tilt the camera module when in use, thereby providing OIS. The controller is configured to receive sensed data indicative of lens and OPFE position and tilt data from the gyro and, based on the received data, generate instructions for causing actuation sub-assemblies 230 and 260 to create movement of the lens module and OPFE that compensates for unintentional tilt of the folded camera module (and thus provide OIS).

The OPFE tilt compensates for camera tilt about the Y axis. The folded lens module movement in the Y direction compensates for camera tilt around the Z axis. The controller receives data on the tilt around Y and tilts the OPFE about Y axis accordingly.

The controller receives data on the tilt around Z and moves the lens module in the Y direction accordingly. There may be undesired tilt of the lens module about the X axis. As explained further below, in some examples, the controller can be configured to receive data indicative of such undesired tilt and to provide commands to actuation sub-assemblies 230 and 260 for creating tilt power to tilt in an opposite direction to the undesired tilt.

Figure 6:
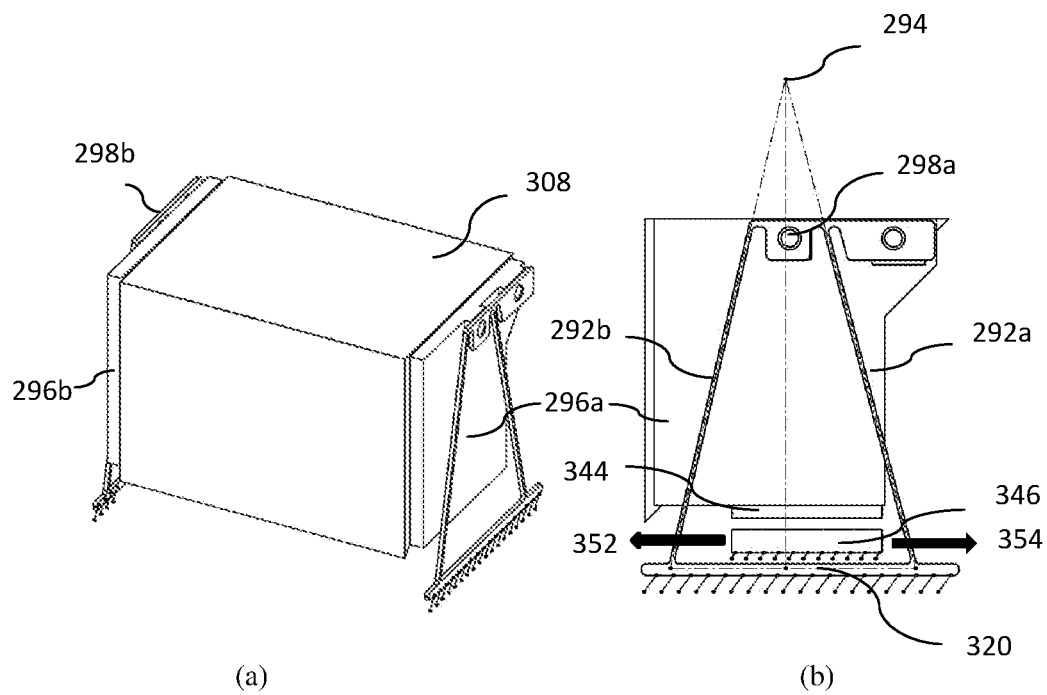
FIG. 6 shows various views of another embodiment of an OPFE actuation sub-assembly, in which the OPFE is in the form of a prism, according to an example of the presently disclosed subject matter: (a) isometric view, (b) external side view, (c) internal side view and (d) bottom isometric view.
Figure 6:
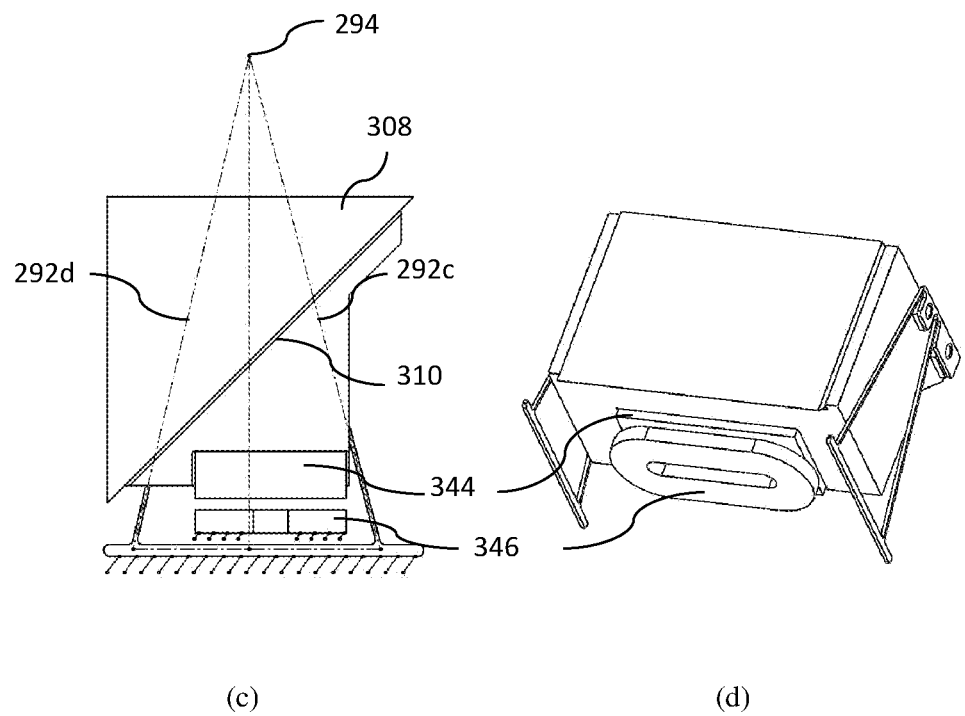

FIG. 6 shows various views of another embodiment of an OPFE actuation sub-assembly, numbered 290, in which the OPFE is in the form of a prism 308 with a reflecting surface 310, according to an example of the presently disclosed subject matter: (a) isometric view, (b) external side view, (c) internal side view and (d) bottom isometric view.

OPFE actuation sub-assembly 290 comprises a hanging structure that includes four flexible hanging members 292a-d that hang prism 308 over a base 320. Flexible hanging members 292a-d are similar to flexible hanging members 216a-d, except that instead of being parallel, they are tilted. They are therefore referred to as "tilted hanging members". Tilted hanging members 292a-d are fixedly mounted on base 320 at one respective member end and attached to the prism at another member end through hinge points 298a and 298b and through side panels 296a and 296b. In particular, tilted hanging members 292a and 292b are attached through hinge point 298a to side panel 296a and tilted hanging members 292c and 292d are attached through hinge point 298b to side panel 296b. The side panels are fixedly coupled to opposite sides of the prism. Tilted hanging members 292a-d allow tilting of prism 308 around a (virtual) hinge axis 294, which is parallel to, or along the Y axis. Actuation sub-assembly 290 further includes a "fifth" actuator that includes a magnet 344 rigidly coupled to prism 308 and a coil 346 rigidly coupled to base 320. This actuator serves in a similar capacity as the fourth actuator comprising magnet 244 and coil 246.

In operation, a Lorentz force may be applied between coil 344 and magnet 346 to move magnet 346 either to the left (arrow 352) or to the right (arrow 354). This force (and magnet movement) is then converted by the tilted hanging members to a tilt ("pendulum") motion around axis 294. The tilt may be typically ±1° from a zero (rest) position of the prism. The motion is measured by a Hall-bar (not shown) as explained above. Such an embodiment allows increase in the Hall-bar sensitivity to tilt actuation, by increasing the relative motion between magnet 244 and the Hall-bar.

Optical Operation of the Actuator Elements

In compact cameras, focusing and in particular autofocusing (AF) is performed by shifting the entire lens module with respect to the camera image sensor, such that the following equation is fulfilled:

$$\frac{1}{f} = \frac{1}{u} + \frac{1}{v}$$

where "f" is the focal length, "u" is the distance between the object and the lens and "v" is the distance between the lens and the image sensor. In camera module 200, focusing (and auto-focusing) may be done by shifting lens module 204 along the Z axis.

As disclosed herein, OIS is configured to compensate for camera shakes that shift the camera module in six degrees of freedom (X-Y-Z, roll, yaw and pitch). However, as mentioned above, the linear motion in X-Y-Z negligibly affects the image quality and does not have to be compensated for. Yaw motion of the camera module (tilt around the Z axis in camera module 200) results in image motion along the Y axis on the image sensor. Yaw motion can then be compensated in camera module 200 by a shift of the lens module 204 along the Y axis. Pitch motion of the camera module (tilt around the Y axis in camera module 200) will result in image motion along the X axis on the sensor. Pitch motion can then be compensated in camera module 200 by a tilt of prism 206 around the Y axis.

Magnetic Operation of the Actuator Elements

Figure 7:
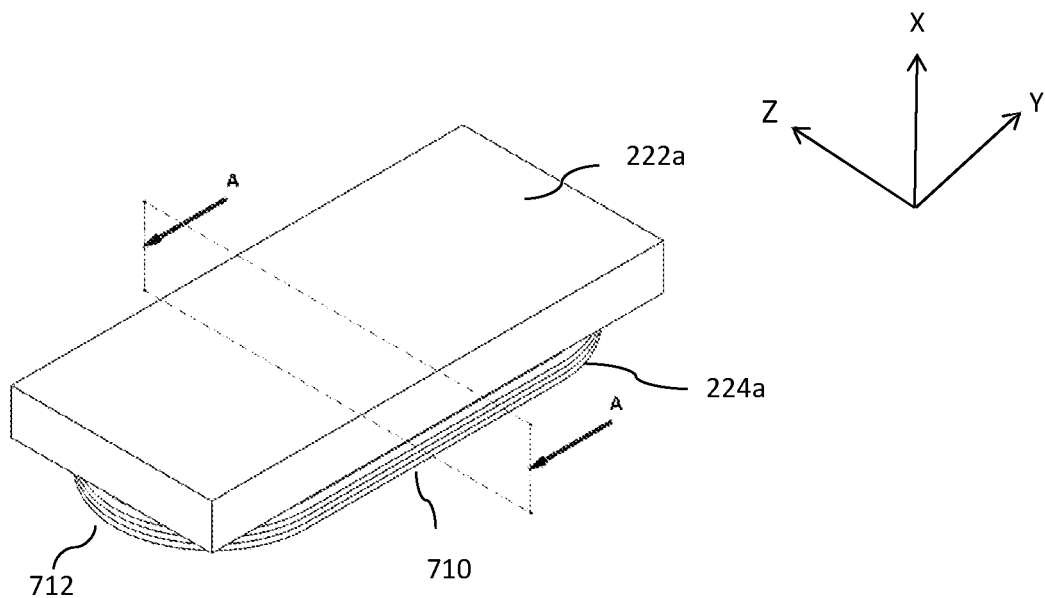
FIG. 7 shows details of an actuator in a folded camera module disclosed herein, according to an example of the presently disclosed subject matter.

Operation of each of the four actuators will now be referred to, by describing in detail, and as an example of operation of the first actuator. Operation of the second, third, fourth and fifth actuators is similar. FIG. 7 shows elements of the first actuator, i.e. coil 224a and magnet 222a, with the associated Hall-bar 226a. Coil 224a can have for example a disco-rectangle (stadium) shape, such that it has one long vertex 710 and one short vertex 712. According to one example, coil 224a can be made from a copper wire coated by a thin plastic layer (coating) having inner/outer diameters, respectively in the range of 40-60 µm, with several tens of turns per coil, such that the total resistance is typically in the order of 10-30 ohms per coil. Magnet 222a can be for example a permanent magnet, made from a neodymium alloy (e.g. $Nd_2Fe_{14}B$) or a samarium-cobalt alloy (e.g. $SmCo_5$). Magnet 222a can be fabricated (e.g. sintered) such that it changes the magnetic poles' direction: on the left side the north magnetic pole faces the negative X direction, while on the right side the north-pole faces the positive X direction. Such "pole changing" magnets are known in the art, and described for example in PCT patent application WO2014/100516A1.

Figure 8:
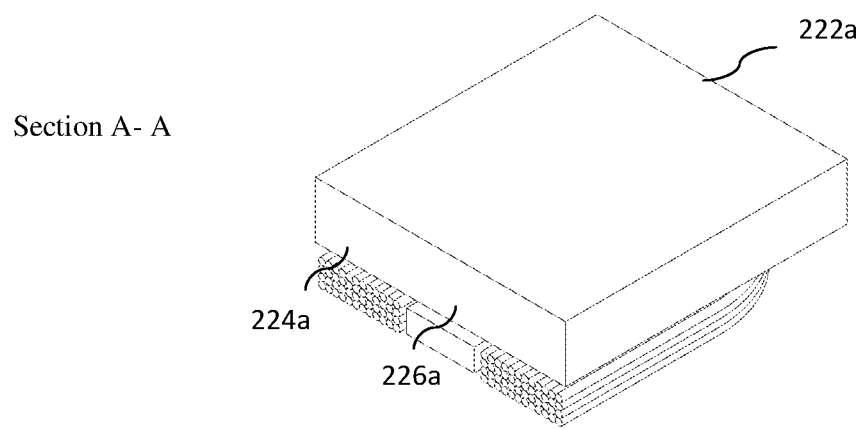
FIG. 8 shows the actuator of FIG. 7 along a cut A-A shown in FIG. 7 in an isometric view.
Figure 9A:
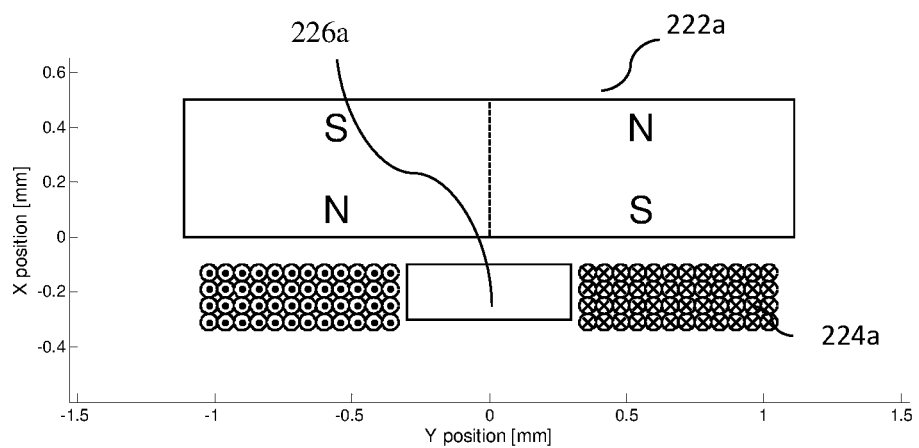
FIG. 9A shows the actuator of FIG. 7 along a cut A-A shown in FIG. 7 in a side view.

FIG. 8 and FIG. 9A show the first actuator along a cut A-A shown in FIG. 7 in isometric and side views respectively. Coil 224a is shown to have a 60 µm diameter and 48 coil turns. In FIG. 9A, a dot "." mark indicates current exiting the page plane toward the reader (positive Z direction) and an "x" mark indicates current in the negative Z direction. The magnetic poles of magnet 222a are indicated, as is the position of Hall-bar 226a.

Figure 9B:
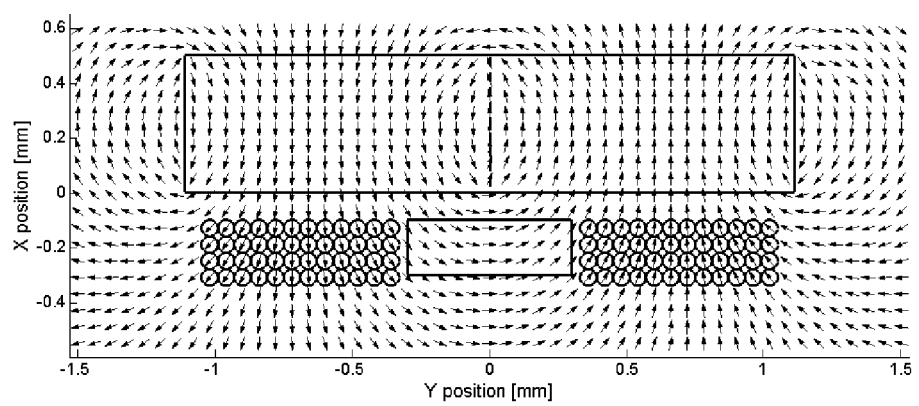
FIG. 9B shows a magnetic simulation along the same cut A-A, where the arrows show the magnetic field direction, according to an example of the presently disclosed subject matter.

FIG. 9B shows a magnetic simulation along the same cut A-A, where the arrows show the magnetic field direction. The Lorentz force is known to be equal to:

$$F = I \int d\vec{\ell} \times B$$

where I is the current in the coil, B is the magnetic field, and $d\vec{l}$ is a wire element. Thus, it can be seen that for the indicated current/magnet state, a force which is mostly in the negative Y direction is applied by the magnet on the coil. According to Newton's third law, an equal and negative force, mostly in the positive Y direction, is applied by the coil on the magnet.

In the embodiment presented here, the Hall-bar is located in the vacant area in the middle of coil 224a. In other embodiments, the Hall-bar may be located in another position (e.g. next to the coil), as long as it magnetically coupled to the corresponding magnet element.

Four Wire-Springs Mechanical Structure

A mechanical structure comprising four round wires can be used for in-plane motion in OIS mechanisms, see e.g. Applicant's published PCT patent application WO2015/060056, the description and figures of which are incorporated herein by reference in their entirety. Table 2 below lists examples of first mode of motion in all six degrees of freedom for wires with diameter in the range of 50-100 µm made for example from metal (e.g. stainless-steel alloy) and carrying a dual-axis actuation assembly with a total mass of 0.5-1 gram.

TABLE 2

| Motion mode | Spring constant range | Frequency range |
| --- | --- | --- |
| X | ~250000 N/m | ~300-4000 Hz |
| Y | 40-60 N/m | 30-60 Hz |
| Z | 40-60 N/m | 30-60 Hz |
| Tilt around X | ~0.001 N * m/rad | ~60-100 Hz |
| Tilt around Y | ~5 N * m/rad | ~500-6000 Hz |
| Tilt around Z | ~1.25 N * m/rad | ~300-4000 Hz |

The typical frequency range for motion in three modes, the Y mode, the Z mode and the "tilt around X" mode is much lower than for the other three modes. This means that physically, motion in X mode, "tilt around Y" mode and "tilt around Z" mode are much stiffer and unlikely to occur under low forces like those that exist in the system (on the order of 0.01N).

As explained above, motion along the Y axis allows OIS performance, while motion along the Z axis allows AF performance. In known single aperture camera modules (for example as described in PCT/IB2014/062181), a tilt motion around the X-axis (in the embodiments shown here an axis parallel to the first optical axis) will not influence the image, since lens modules are axis-symmetric around this axis. In the embodiments of folded-lens cameras disclosed herein the X axis lies in the plane containing the first and second optical paths and is perpendicular to the second optical axis. In the cameras disclosed herein, an X-axis-tilt may cause distortion or shift the image, and is thus undesired. Therefore, two "undesired X-axis tilt" prevention methods are described below.

A first method to prevent X-axis-tilt is to actively cancel it. This method is described with reference to camera module 200. As explained above, -operation of the first actuator creates a force on magnet 222a in the ±Y direction, while operation of second and third actuators creates a force on magnets 222b and 222c in the ±Z direction. However, since the forces applied on the magnets are also applied on lens actuation sub-assembly 230, which is a rigid body, translation of the force on each magnet is also translated to a torque on the mass center of lens actuation sub-assembly 230. Table 3 shows the result of force applied on each of magnets 222a-c to the mass center of lens actuator sub-assembly 230. Using a combination of the three (first, second and third) actuators can create force in the Z-Y plane and torque around the X axis such that the desired motion is achieved, namely creation of Y motion for OIS, creation of Z motion for auto-focus, and removal of any unwanted X-axis-tilt.

TABLE 3

| Force on magnet | | Result of the force action on the mass center of lens actuation sub-assembly 230 | |
|---|---|---|---|
| Magnet | Force direction | Force | Torque (around X axis) |
| 222a | +Y | +Y | Counter clockwise |
|  | −Y | −Y | Clockwise |
| 222b | +Z | +Z | Clockwise |
|  | −Z | −Z | Counter clockwise |
| 222c | +Z | +Z | Counter clockwise |
|  | −Z | −Z | Clockwise |

A second method to prevent X-axis tilt is "passive", and is based on reducing the torque forces created by the first, second and third actuators. This method is demonstrated schematically using the actuator arrangements shown in FIG. 10 and FIG. 11.

Figure 10:
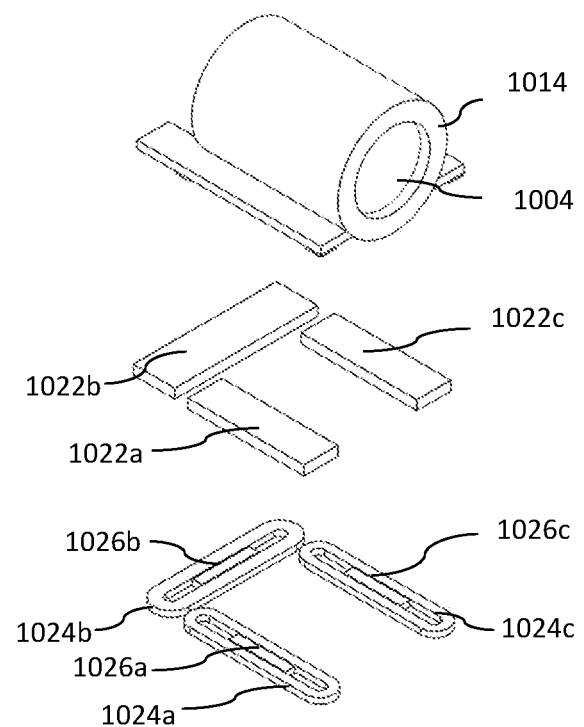
FIG. 10 shows an arrangement for lens actuation with three actuators, according to an example of the presently disclosed subject matter.

FIG. 10 shows a lens barrel 1014 carrying a lens module 1004 with components of three (first, second and third) actuators similar to the actuators in embodiments above (magnets 1022a, 1022b and 1022c located just above coils 1024a, 1024b and 1024c, respectively). Actuators including these elements do not produce undesired tilt around the X axis. Note that magnet 1022b and coil 1024b are shown here as extending substantially (i.e. having a length dimension along) the entire width of the lens barrel (in the Y direction). This arrangement allows the magnet and coil to be positioned between the lens barrel and the sensor. This is beneficial, since if even part of the actuator is positioned below the lens barrel, the total height of the module (in the X direction) increases below a required height. Exemplarily, the length of magnet 1022b and coil 1024b in the Y direction may be ca. 7-8 mm and the width of magnet 1022b and coil 1024b in the Z direction may be ca. 2-3 mm. The height of all coils is exemplarily ca. 0.5 mm. The arrangement of the first, second and third actuators is such that the torque on mass center of lens actuation sub-assembly is minimal. That is, these actuators do not produce undesired tilt around the X axis. Table 4 shows the translation of force on each of magnets 1022a-c to the mass center of the lens actuation sub-assembly.

TABLE 4

| Force on magnet | | Result of the force action on the mass center of the lens actuation sub-assembly | |
|---|---|---|---|
| Magnet | Force direction | Force | Torque (around X axis) |
| 1022a | +Y | +Y | Negligible |
|  | −Y | −Y | Negligible |
| 1022b | +Z | +Z | Negligible |
|  | −Z | −Z | Negligible |
| 1022c | +Y | +Y | Negligible |
|  | −Y | −Y | Negligible |

Figure 11:
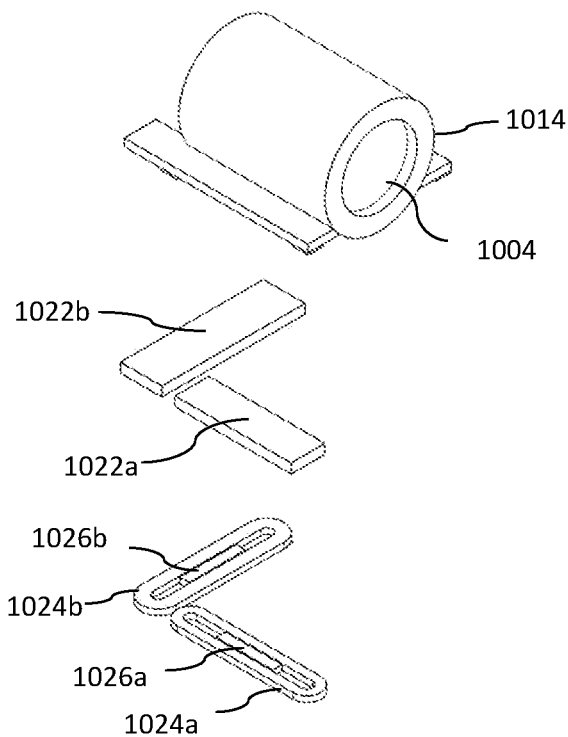
FIG. 11 shows an arrangement for lens actuation with two actuators, according to an example of the presently disclosed subject matter.

FIG. 11 shows an arrangement for lens actuation with two actuators, according to an example of the presently disclosed subject matter. The actuator arrangement uses only two (e.g. first and second) actuators of the actuators in FIG. 10. This arrangement is simpler, as it may achieve the same result while removing one actuator from the arrangement of FIG. 10.

Figure 12A:
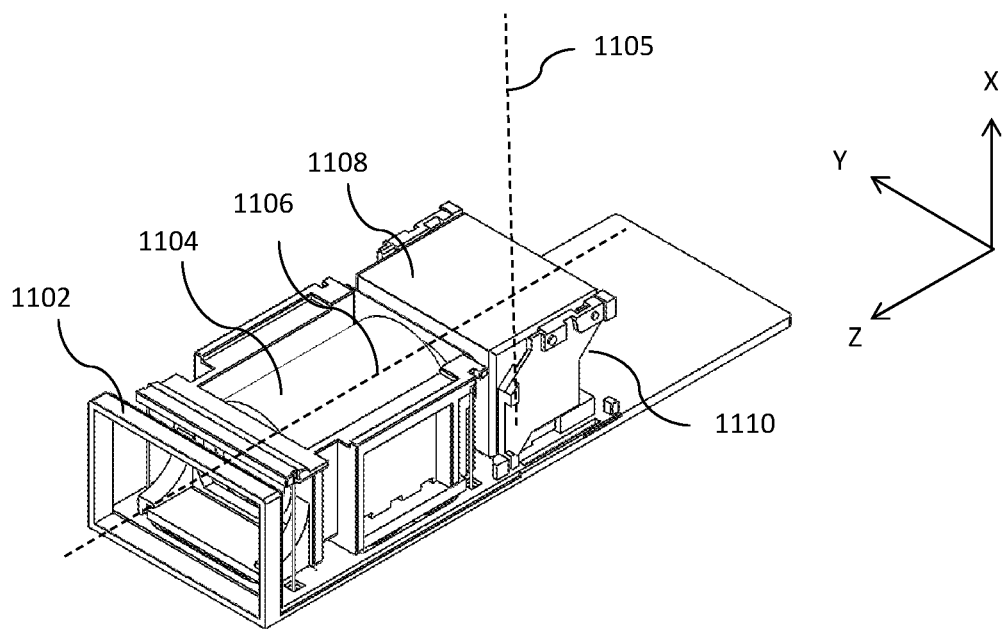
FIG. 12A shows schematically an isometric view of another folded camera module comprising both AF and OIS mechanisms, according to an example of the presently disclosed subject matter.

FIG. 12A shows schematically an isometric view of another folded camera module numbered 1100, according to an example of the presently disclosed subject matter. Note that the X-Y-Z coordinate system is oriented differently than in FIGS. 1-11. Folded camera module 1100 comprises an image sensor 1102 having an imaging surface in the X-Y plane, a lens module 1104 with an optical axis 1106 defined above as "second optical axis" and an OPFE 1108 having a surface plane 1110 tilted to the image sensor surface, such that light arriving along a first optical path or direction 1105 is tilted by the OPFE to the second optical axis or direction 1106.

Figure 12B:
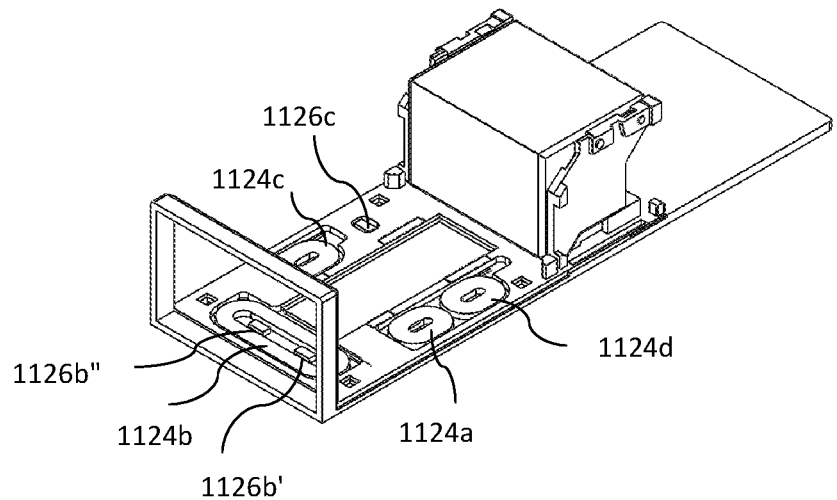
FIG. 12B shows schematically an isometric view of the dual-aperture camera of FIG. 12A with the folded lens module removed from its mounting, according to an example of the presently disclosed subject matter.
Figure 12C:
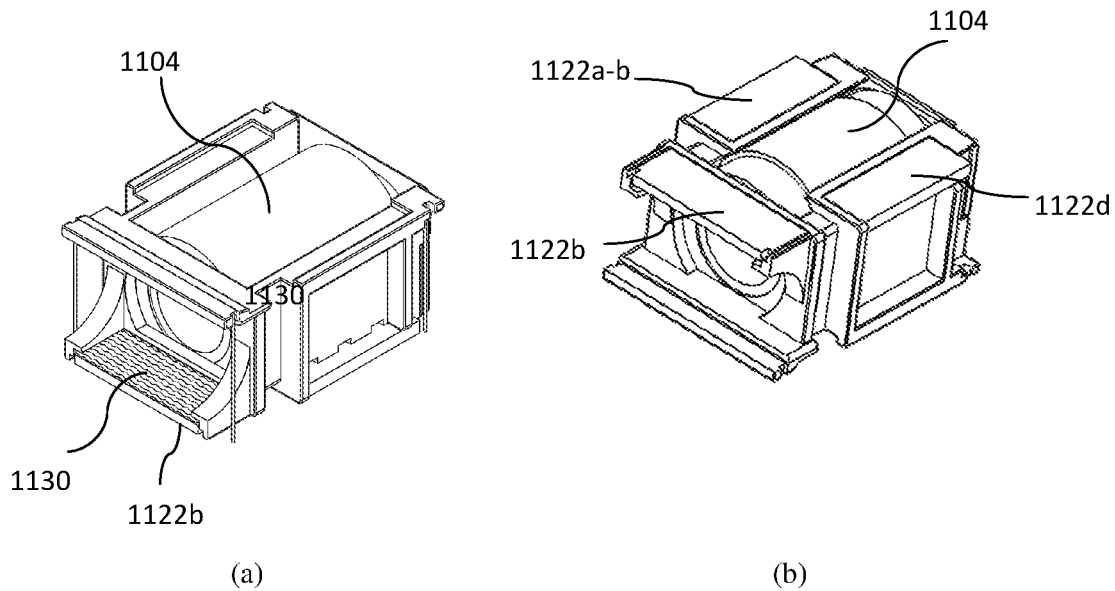
FIG. 12C shows schematically an isometric view of the dual-aperture camera of FIG. 12A with the folded lens module in (a) a regular view and (b) turned upside down, according to an example of the presently disclosed subject matter.

FIG. 12B shows folded camera module 1100 with the folded lens module removed from its mounting. FIG. 12C shows the folded lens module in (a) a regular isometric view and (b) turned upside down.

In an embodiment, camera module 1100 comprises a lens actuation sub-assembly for moving lens module 1104 for autofocus in the Z direction. This sub-assembly may include a single actuator with a magnet 1122ab and a coil 1124b. In other embodiments, camera module 1100 may comprise a lens actuation sub-assembly for moving lens module 1104 in the Y-Z plane. However, in contrast with the 3-actuator lens actuation sub-assembly shown in FIGS. 3 and 10, the actuation sub-assembly in folded camera module 1100 comprises four actuators operating on the lens module. In other words, an additional "sixth" actuator is added to the first, second and third actuators of the lens actuation sub-assembly: here, the first actuator includes a magnet 1122ab and a coil 1124a, the second actuator includes magnet 1122ab and coil 1124b, the third actuator includes a magnet 1122c and a coil 1124c. The added ("sixth") actuator includes magnet 1122d and a coil 1124d. The magnet and coil arrangement is similar to that in FIG. 10, in that magnet 1122b and coil 1124b are positioned between the lens module and the image sensor, enabling efficient Z-axis actuation (for autofocus). The actuators including magnet 1122ab and coil 1124a, magnet 1122ab and coil 1124b and magnet 1122d and a coil 1124d may be used actively to prevent undesirable tilt around the X-axis. Two Hall-bar sensors 1126b' and 1126b" measure displacement in the Z direction and tilt around the X axis. A Hall-bar sensor 1126c measures displacement in the Y direction.

The long coil dimension in the Y direction provides high efficiency for autofocus action in the Z direction. To illustrate how a coil electrical power ($P_e$) and mechanical force (F) depend on the coil size, one can analyze a simple case of a single-turn coil. A coil with a wire cross-section area S is placed on a Y-Z plane and has exemplarily a rectangular shape with two sides of length $L_y$ parallel to Y and two sides of length $L_z$ parallel to Z. The permanent magnet (ferromagnet) that produces the magnetic field in the coil is designed to maximize the force between coil and magnet in the Z direction ($F_z$), resulting from current I flowing in the coil. In this case, $F_z=2k_1IL_y$, where $k_1$ is a constant depending (among others on the magnetic field strength. The coil electrical power is $P_e=2k_2I^2S(L_z+L_y)$, where $k_2$ is a different constant. Efficient magnetic engines have high $F_z$ for low $P_e$. An efficiency factor ($E_f=F_z/P_e$) can be derived as:

$$E_f=((k_1^2)*S)/(k_2*F_z)*L_y/(1+L_z/L_y)$$

or, by using $I=F_z/(2k_1L_y)$ $$E_f=[((k_1^2)*S)/(k_2*F_z)]*L_y/(1+L_z/L_y)$$

From the above it is clear that if $L_y$ is increased by a factor of 2 (everything else being equal), then $E_f$ will increase by a factor greater than 2. Thus, the longer the coil in the Y direction, the better. The positioning of magnet 1122c between the lens module and the image sensor advantageously allows to lengthen the magnet in the Y direction to approximately the lens module carrier width. Exemplarily, coil 1124c has a long dimension or vertex (typically ca. 7-8 mm) in the Y direction and a short dimension or vertex (typically ca. 2-3 mm) in the Z direction. In general, for single- or multi-turn coils, the longer the coil in the direction perpendicular to the magnetic force the more efficient will be the magnetic engine utilizing this coil.

Figure 13:
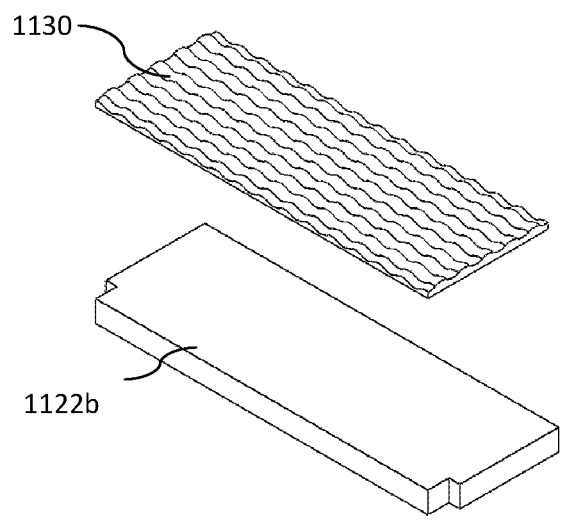
FIG. 13 shows schematically a magnet in the folded lens module of FIG. 12C coated with an absorption and scattering coating, according to an example of the presently disclosed subject matter.

The positioning of the magnet of the AF actuator between the lens module and image sensor may cause light reflections of light arriving along the optical axis of the lens (Z-axis). Such reflections may affect the image acquired at the folded camera image sensor. In order to prevent such reflections, the magnet (i.e. magnet 1122c) may be a coated with an absorption and scattering coating (FIG. 12C and FIG. 13), for example an Actar Black Velvet coating manufactured by Actar Ltd., Kiryat Gat, Israel. Alternatively or in addition, the magnet can have perturbations in the shape of waves or other shapes to further scatter reflected light. Alternatively, a wavy thin plate structure ("yoke") 1130 with an absorption and scattering coating as above may be attached to the magnet.

In summary, some camera embodiments disclosed herein include at least the following features:
1. Fully closed loop AF+OIS functionality.
2. Slim design, no height penalty.
3. Low cost design:
   Integrated circuitry for OIS, AF and camera sensors.
   Moving mass which is completely passive—no need to convey electricity to moving objects.

While this disclosure has been described in terms of certain embodiments and generally associated methods, alterations and permutations of the embodiments and methods will be apparent to those skilled in the art. For example, while the incorporation of a folded camera module described herein in a dual-aperture camera is described in some detail, a folded camera module may be incorporated in a multi-aperture camera having more than two camera modules. For example, while the use of Hall-bars as an example of position sensors is described in detail, other position sensors (for example micro-electro-mechanical system (MEMS)-type position sensors) may be used for purposes set forth herein. The disclosure is to be understood as not limited by the specific embodiments described herein.

It is emphasized that citation or identification of any reference in this application shall not be construed as an admission that such a reference is available or admitted as prior art.

What is claimed is:
1. A folded camera module, comprising:
   a) a lens module having a lens optical axis; and
   b) an optical path folding element (OPFE) for folding light from a first optical path to a second optical path towards an image sensor, the second optical path being along the lens optical axis,
      wherein the lens module is designed to be moved for auto-focus (AF) along a first direction substantially parallel to the lens optical axis,
      wherein the OPFE is designed to be tilted for optical image stabilization (OIS) around a single OPFE tilt axis that is parallel to a second direction to compensate for tilt of the folded camera module around the second direction, and
      wherein the second direction is substantially orthogonal to both the first and second optical paths.
2. The folded camera module of claim 1, further comprising:
   c) a lens actuation sub-assembly configured to actuate the lens module movement in the first direction; and
   d) an OPFE actuation sub-assembly configured to tilt the OPFE around the a single OPFE tilt axis.
3. The folded camera module of claim 2, further comprising one or more position sensors that enable measurement of a position of the lens module and measurement of OPFE tilt.
4. The folded camera module of claim 3, further comprising an actuation controller configured to receive a data input indicative of the folded camera tilt and a data input from the one or more position sensors and to generate, in response to the data inputs, movement instructions and tilt instructions to, respectively, the lens and OPFE actuation sub-assemblies.
5. The folded camera module of claim 2, wherein each of the lens actuation sub-assembly and the OPFE actuation sub-assembly includes a plurality of flexible hanging members.
6. The folded camera module of claim 5, wherein the flexible hanging members of the lens actuation sub-assembly are parallel to each other.
7. The folded camera module of claim 5, wherein the flexible hanging members of the OPFE actuation sub-assembly are tilted.
8. The folded camera module of claim 1, wherein the OPFE tilt axis is a virtual axis.
9. The folded camera module of claim 2, wherein the OPFE actuation sub-assembly includes at least one coil-magnet pair for actuating the OPFE tilt.
10. The folded camera module of claim 9, wherein at least one of the coil-magnet pair is positioned below the OPFE.
11. The folded camera module of claim 1, wherein the OPFE includes a prism or a mirror.
12. The folded camera module of claim 2, wherein the lens actuation sub-assembly includes a plurality of coil-magnet pairs for actuating the lens module movement.
13. The folded camera module of claim 12, wherein the plurality of coil-magnet pairs includes two coil-magnet pairs.
14. The folded camera module of claim 12, wherein at least one of the plurality of coil-magnet pairs is positioned between the lens module and the image sensor.
15. A method of providing optical image stabilization (OIS) and auto-focus (AF) in a folded camera module, the folded camera module comprising a lens module having a lens optical axis and an optical path folding element (OPFE) for folding light from a first optical path to a second optical path towards an image sensor, the second optical path being along the lens optical axis, the method comprising:
   a) moving the lens module for AF along a first direction substantially parallel to the lens optical axis; and
   b) tilting the OPFE for OIS around a single OPFE tilt axis parallel to a second direction to compensate for tilt of the folded camera module around the second direction, wherein the second direction is substantially orthogonal to both the first and second optical paths.
16. The method of claim 15, further comprising:
   c) operating a lens actuation sub-assembly configured to actuate the lens module movement along the first direction; and
   d) operating an OPFE actuation sub-assembly configured to actuate the tilt of the OPFE around the a single OPFE tilt axis.
17. The method of claim 16, wherein each of the lens actuation and OPFE actuation sub-assemblies includes a plurality of flexible hanging members, the method further comprising tilting the flexible hanging members of the OPFE actuation sub-assembly.

18. The method of claim 15, wherein the tilting of the OPFE is around a virtual axis.

* * * * *